(12) United States Patent
Miyamoto et al.

(10) Patent No.: US 9,827,867 B2
(45) Date of Patent: Nov. 28, 2017

(54) ELECTRIC POWERED VEHICLE

(71) Applicant: TOYOTA JIDOSHA KABUSHIKI KAISHA, Toyota-shi, Aichi-ken (JP)

(72) Inventors: Tomohiko Miyamoto, Toyota (JP); Masaya Yamamoto, Toyota (JP); Toshinori Okochi, Toyota (JP); Takeshi Ishida, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 8 days.

(21) Appl. No.: 14/923,727

(22) Filed: Oct. 27, 2015

(65) Prior Publication Data

US 2016/0114697 A1 Apr. 28, 2016

(30) Foreign Application Priority Data

Oct. 27, 2014 (JP) .................................. 2014-218612

(51) Int. Cl.
*B60L 11/00* (2006.01)
*B60L 11/18* (2006.01)

(52) U.S. Cl.
CPC ....... *B60L 11/1861* (2013.01); *Y02T 10/7005* (2013.01); *Y02T 10/7275* (2013.01)

(58) Field of Classification Search
CPC combination set(s) only.
See application file for complete search history.

(56) References Cited

U.S. PATENT DOCUMENTS

| 4,686,834 A | * | 8/1987 | Haley | F04D 27/02 62/209 |
| 5,629,592 A | * | 5/1997 | Henmi | B60L 9/30 303/41 |
| 5,731,669 A | * | 3/1998 | Shimizu | B60L 11/1807 318/139 |

(Continued)

FOREIGN PATENT DOCUMENTS

| JP | 2011109765 A | 6/2011 |
| JP | 2014-082855 A | 5/2014 |
| WO | 2013105136 A1 | 7/2013 |

OTHER PUBLICATIONS

English translation of communication dated Nov. 1, 2016, from the Japanese Patent Office in counterpart application No. 2014-218612.

*Primary Examiner* — Edward J Pipala
(74) *Attorney, Agent, or Firm* — Sughrue Mion, PLLC

(57) ABSTRACT

An electric powered vehicle includes: a motor; an inverter configured to convert electric power from a battery to drive the motor; a transmission configured to shift the rotation output of the motor at a variable transmission gear ratio; and a controller configured to control the inverter to control the driving of the motor and to control a change in the shift gear stage, and to perform high surge region avoidance control for changing the gear ratio of the transmission to change a motor rotation speed while maintaining a vehicle speed and changing an operation point outside a high surge region, when the operation point of the motor enters the high surge region where the inverter is controlled by a PWM overmodulation control system, and the high surge region is defined to be equal to or higher than a predetermined rotation speed and equal to or less than predetermined torque.

3 Claims, 11 Drawing Sheets

(56) References Cited

U.S. PATENT DOCUMENTS

| | | | |
|---|---|---|---|
| 2009/0159350 A1* | 6/2009 | Hanada | B60K 6/365 180/65.265 |
| 2011/0279071 A1* | 11/2011 | Yamada | H02P 21/0021 318/400.02 |
| 2012/0217907 A1* | 8/2012 | Sakaguchi | H02P 6/21 318/400.1 |

* cited by examiner

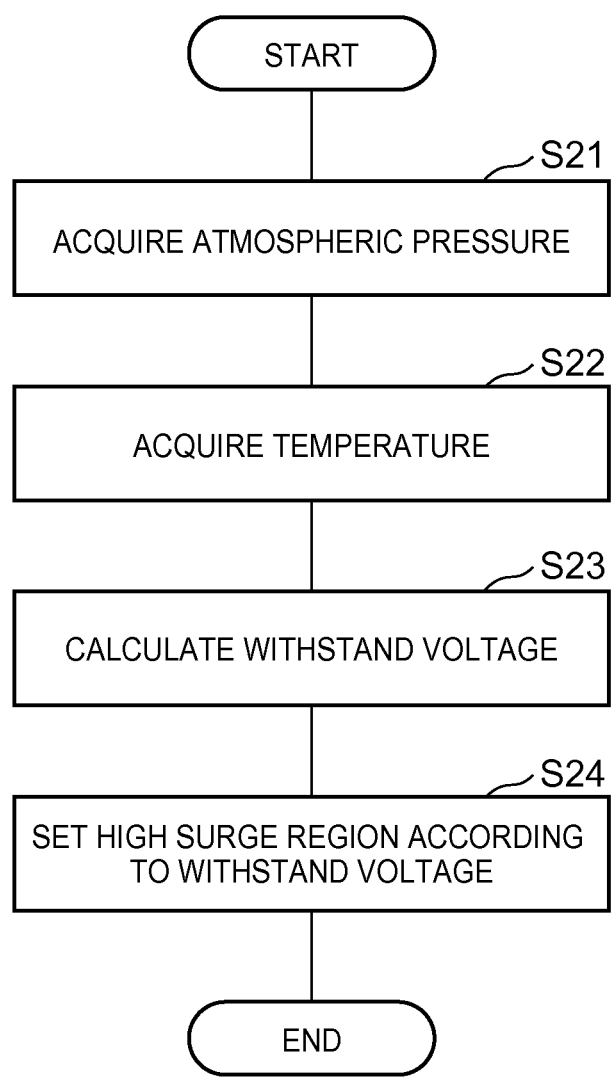

ELECTRIC POWERED VEHICLE

INCORPORATION BY REFERENCE

The disclosure of Japanese Patent Application No. 2014-218612 filed on Oct. 27, 2014 including the specification, drawings and abstract is incorporated herein by reference in its entirety.

BACKGROUND OF THE INVENTION

1. Field of the Invention

The present invention relates to an electric powered vehicle in which a PWM driven motor is mounted.

2. Description of Related Art

There are electric powered vehicles which travel with a drive force of a motor, and the electric powered vehicles include an electric vehicle (EV) in which an engine is not mounted, and a hybrid vehicle (HV) in which both of a motor and an engine are mounted.

In such an electric powered vehicle, normally, a battery is mounted, and electric power from the battery is converted to a desired AC current by an inverter to drive the motor. In this case, output torque of the motor should be controlled to follow requested torque of the vehicle according to an accelerator depression amount. Accordingly, in a normal case, switching of the inverter is controlled by a PWM control signal, thereby obtaining motor output torque according to requested torque of the vehicle.

Here, PWM control of the motor performs sine wave control where a drive waveform normally becomes a sine wave; however, when a motor output is great and a modulation rate is high, overmodulation control and square wave control are performed.

In the PWM control, if the overmodulation control is performed, the drive waveform does not become a sine wave, and a disturbance occurs in the drive waveform. During high-speed traveling, when torque output is low in a state where the motor rotation speed is high, a fine current pulse occurs, and a surge becomes great. In particular, when torque output is low, the amount of current is small; therefore, a motor current zero-crosses multiple times due to a disturbance in the motor current, and a surge is likely to become extremely great.

If the surge is extremely great, the withstand voltage of the motor should be made great to that extent, and the build of the motor becomes great. Accordingly, it is desirable to suppress the occurrence of a great surge.

Japanese Patent Application Publication No. 2014-082855 (JP 2014-082855 A) describes controlling a transmission gear ratio in order to prevent the occurrence of noise during overmodulation control. However, in JP 2014-082855 A, since gear shift control is performed so as to avoid the entire overmodulation control, unintended gear shift control by a user occurs frequently, and the user is likely to feel a sense of discomfort.

SUMMARY OF THE INVENTION

The invention provides an electric powered vehicle in which a PWM driven motor is mounted, having an advantage of suppressing the occurrence of a great surge.

An electric powered vehicle according to an aspect of the invention includes a motor, an inverter which converts electric power from a battery to drive the motor, a transmission which shifts the rotation output of the motor at a variable transmission gear ratio, and a controller configured to control the inverter to control the driving of the motor and to control a change in the shift gear stage of the transmission. The controller performs high surge region avoidance control for, when an operation point of the motor enters a high surge region where the inverter is controlled by a PWM overmodulation control system, and it is defined to be equal to or higher than a predetermined rotation speed and equal to or less than predetermined torque, changing the transmission gear ratio of the transmission to change a motor rotation speed while maintaining a vehicle speed, and to change the operation point outside the high surge region.

It is preferable that the controller changes the range of the high surge region according to motor temperature, atmospheric pressure, or an inverter input voltage.

It is preferable that the controller relaxes a condition for performing the high surge region avoidance control during steady traveling with little fluctuation in the vehicle speed.

According to the aspect of the invention, when the operation point of the motor enters a region where a surge is likely to occur, high surge region avoidance control for controlling a transmission gear ratio so as to avoid the region is performed. With this, it is possible to suppress the occurrence of a great surge.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart showing setting of a high surge region according to a withstand voltage;

DETAILED DESCRIPTION OF EMBODIMENTS

Figure 1:
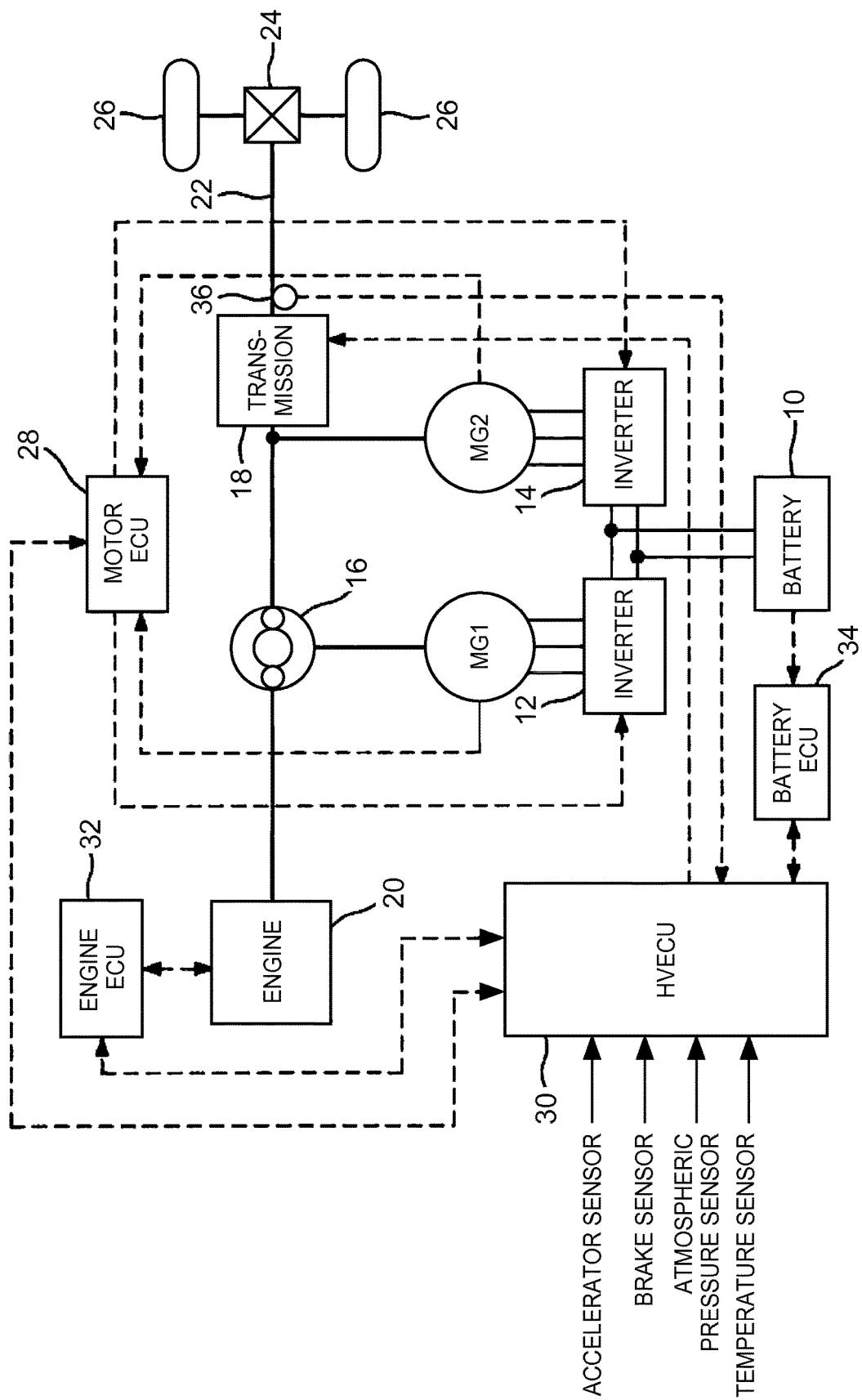
FIG. 1 is a diagram showing the configuration of a main part of an electric powered vehicle according to an embodiment.

Hereinafter, an embodiment of the invention will be described referring to the drawings. Note that the invention is not limited to the embodiment described herein.

FIG. 1 is a diagram showing the configuration of a main part of an electric powered vehicle according to an embodiment. DC electric power from a battery 10 is supplied to inverters 12, 14. Preferably, electric power from the battery 10 may be boosted by a boost converter and then supplied to the inverters 12, 14.

The inverter 12 has three legs in which a transistor, such as an IGBT, and two elements with diodes flowing a reverse current of the transistor connected in parallel are connected in series, and obtains three outputs (three-phase AC output) from the intermediate points of the respective legs.

A motor generator MG1 is connected to the inverter 12, and a motor generator MG2 is connected to the inverter 14. An output shaft of the motor generator MG1 is connected to a sun gear S of a planetary gear 16 which is a power transmission element, and an output shaft of the motor generator MG2 is connected to a ring gear R of the planetary gear 16. An output shaft of an engine 20 is connected to a carrier C of the planetary gear 16.

To the ring gear R of the planetary gear 16, the output shaft of the motor generator MG2 is connected, and a drive shaft 22 is connected through a transmission 18. Then, a drive force of the drive shaft 22 is transmitted to wheels 26 through a differential gear 24.

The transmission 18 has multiple shift gear stages, and controls the ratio (transmission gear ratio) of the rotation speed of the motor generator MG2 and the ring gear and the rotation speed of the drive shaft 22.

Rotation phase information of the motor generators MG1, MG2 is supplied to a motor ECU 28. An HVECU 30 is connected to the motor ECU 28, and the motor ECU 28 generates a PWM control signal based on output torque commands of the motor generators MG1, MG2 supplied from the HVECU 30 and the rotation phase information, and controls the switching of the inverters 12, 14 to control the driving of the motor generators MG1, MG2. The motor generators MG1, MG2 are motors which function as generators.

An engine ECU 32 is connected to the engine 20, and the engine ECU 32 controls a fuel supply amount or the like based on a command from the HVECU 30 to control the driving of the engine 20.

The state of charge SOC of a battery or the like is supplied to a battery ECU 34, and manages the state of the battery. The HVECU 30 is connected to the battery ECU 34, and the HVECU 30 controls the driving of the engine 20 and the motor generators MG1, MG2 according to the state of charge of the battery 10 to control the charge or discharge current of the battery 10.

The rotation speed of the drive shaft 22 which is an output shaft of the transmission 18 is detected by a rotation speed sensor 36, and the rotation speed is supplied to the HVECU 30. The rotation speed of the drive shaft 22 corresponds to the rotation speed of the wheels 26, and a vehicle speed.

An accelerator depression amount detected by an accelerator sensor, a brake depression amount detected by a brake sensor, state information of an ignition switch, shift position information, and the like are supplied to the HVECU 30. The HVECU 30 generates the output torque commands of the motor generators MG1, MG2 and an output torque command of the engine 20 based on various kinds of supplied information and supplies the output torque commands to the motor ECU 28 and the engine ECU 32, and the motor ECU 28 and the engine ECU 32 control the driving of the motor generators MG1, MG2 and the engine 20. Accordingly, the HVECU 30 and the motor ECU 28 function as control means for controlling the motor generators MG1, MG2.

The control of the inverters 12, 14 by the motor ECU 28 is PWM control. For example, a PWM control signal is generated by comparing a carrier of a triangular wave having a predetermined frequency with a voltage command, and accordingly, the switching of the transistors of the inverters 12, 14 is controlled.

Figure 2:
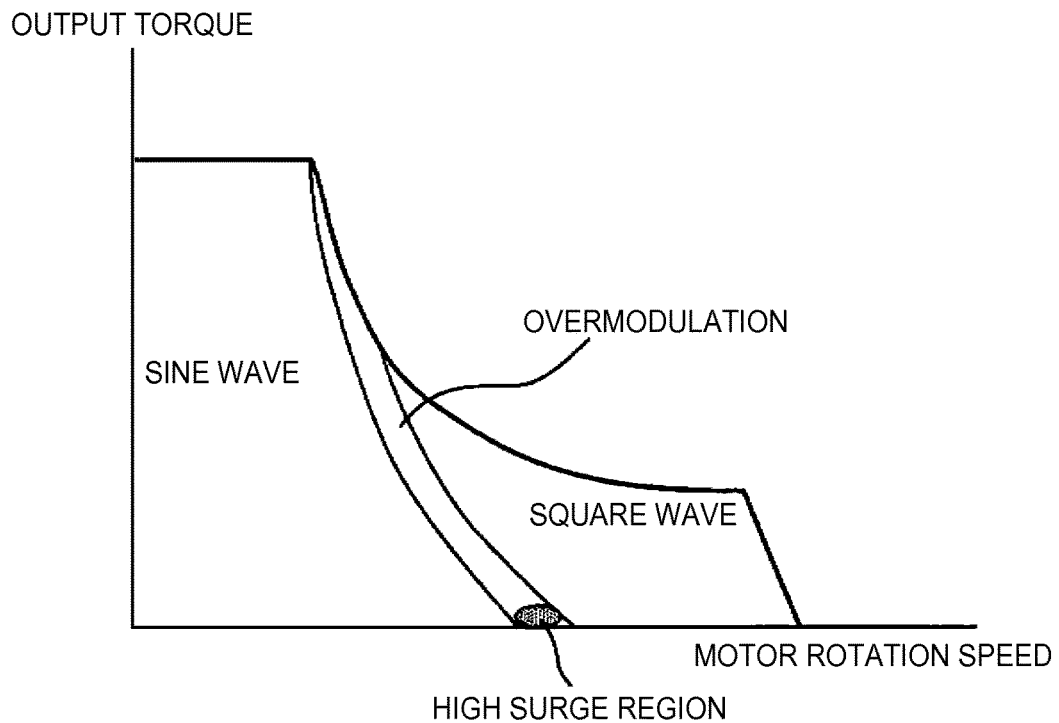
FIG. 2 is a diagram showing selection of a control system of PWM control.

The PWM control includes sine wave control, overmodulation control, and square wave control. FIG. 2 shows selection of these kinds of control. The vertical axis of FIG. 2 represents output torque, and the horizontal axis represents a rotation speed. A line surrounding the outside indicated by a thick solid line indicates maximum torque. In a low rotation speed region, sine wave control is basically performed. This is because the modulation rate is comparatively low. If the rotation speed becomes high, a counter electromotive voltage becomes high, the modulation rate becomes high, the sine wave control is not performed, and overmodulation control is performed. In addition, if the rotation speed becomes high, square wave control is performed in order to obtain required output.

The operation of the motor generators MG1, MG2 may become operation at a high rotation speed and low output torque in a region of overmodulation control. For example, during high-speed constant speed operation or the like, the motor generator MG2 is placed in this state.

In this region, torque is low, the motor current is small, and the pulse width is extremely small around zero-cross. In addition, since a dead time is provided in order to prevent upper and lower elements of one leg from being simultaneously turned on, no pulse may be generated, the motor current is disturbed, and zero-cross may be repeated multiple times. In the PWM control, when the upper element is turned on, a voltage of a motor input terminal becomes an inverter input voltage, and accordingly, a great surge voltage is likely to be generated according to a pulse with a short width. In FIG. 2, a region where a great surge is likely to be generated is indicated as a high surge region. In the high surge region, a surge voltage is likely to become higher on a side near square wave control.

In this high surge region, if the withstand voltage of the motor is low, there is a risk to cause dielectric breakdown. Accordingly, in this embodiment, when it is about to enter the high surge region, means for avoiding the region is employed.

<Change of Transmission Gear Ratio>

Figure 3:
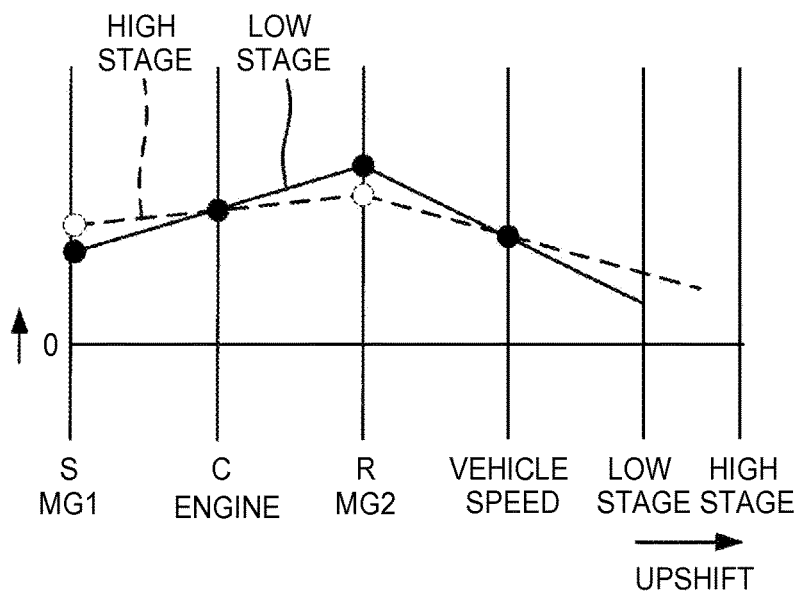
FIG. 3 is a diagram showing the state of a rotation speed of a planetary gear in gear shift.

In FIG. 3, the rotation speed of three gears and shift gear stages in the planetary gear 16 are shown. In the drawing, a portion shown by a black circle is when the shift gear stage of the transmission 18 is a low-speed stage.

If the shift gear stage of the transmission 18 is changed to a high-speed stage side (upshift), the same vehicle speed is maintained and the rotation speed of the ring gear and the motor generator MG2 decreases with the change in the shift gear stage. For example, if the high-speed stage has a transmission gear ratio of 1 and the low-speed stage has a transmission gear ratio of 1.5, the rotation speed of the ring gear becomes 1/1.5 at the same vehicle speed. If the engine speed is not changed, the rotation speed of the motor generator MG1 changes uniquely with a change in the rotation speed of the motor generator MG2. Since the operation of the engine 20 is determined by an output power command of the engine 20 at this time, or the like, the rotation speed of the carrier C corresponding to the engine speed does not change. For this reason, the rotation speed of the motor generators MG1, MG2 changes by gear shift.

In this way, the change is performed to a side on which the transmission gear ratio of the transmission 18 (upshift to a high-speed stage) becomes small, whereby it is possible to decrease the rotation speed of the motor generator MG2, and therefore, to avoid the motor generator MG2 from entering in the high surge region.

Of course, the change of the operation point may be performed in a state where output power is maintained, and accordingly, change of drivability by gear shift may become small.

Figure 4:
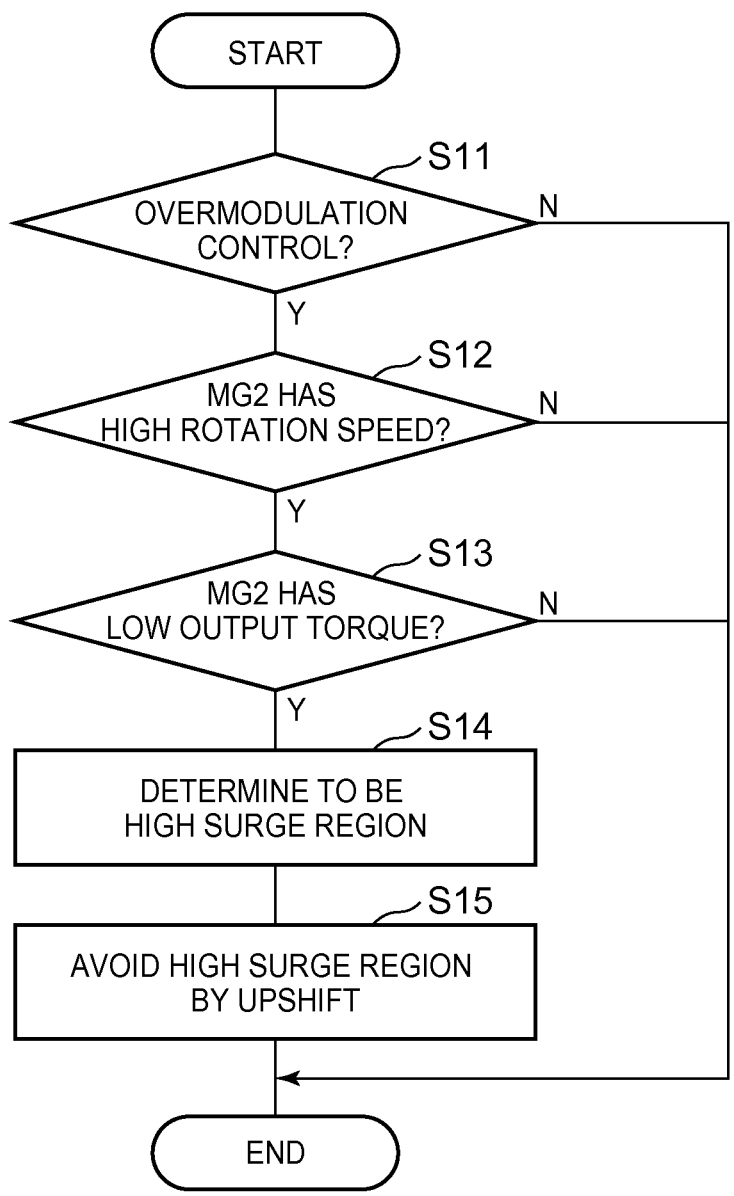
FIG. 4 is a flowchart showing high surge region avoidance processing.

FIG. 4 is a flowchart of the above-described processing in the HVECU 30. It is determined whether or not overmodulation control is performed (S11), and if the determination is YES, it is determined whether or not the motor generator MG2 has a high rotation speed (S12), if the determined result is YES, it is determined whether or not the motor generator MG2 has low output torque (S13), and if the determination is YES, it is determined that the operation point of the motor generator MG2 is in the high surge region (S14). Accordingly, upshift is executed in the transmission 18, and the rotation speed of the motor generator MG2 decreases while maintaining the vehicle speed, thereby avoiding entering the high surge region (S15). In S11, S12, and S13, when the determination is NO, the processing ends as it is. With this processing, it is possible to prevent the operation point of the motor generator MG2 from entering the high surge region.

<Atmospheric Pressure>

Figure 5:
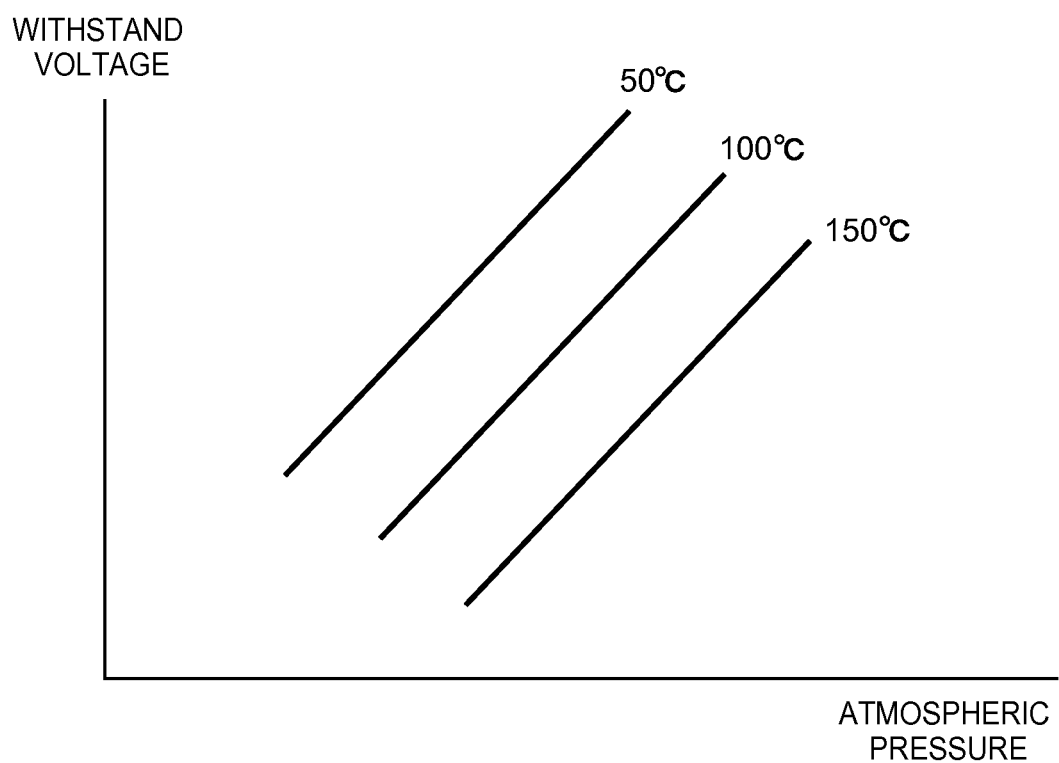
FIG. 5 is a diagram showing the relationship of an atmospheric pressure, temperature, and a withstand voltage.

FIG. 5 shows the relationship of an atmospheric pressure, a temperature, and a motor withstand voltage. If the atmospheric pressure is low, discharging is likely to occur; therefore, the withstand voltage becomes small when the atmospheric pressure is low. Furthermore, the withstand voltage becomes low when the temperature is high. That is, if the temperature becomes low, the relationship of the atmospheric pressure and the withstand voltage is shifted to a side on which the withstand voltage is low.

Accordingly, it is preferable to change the range of the high surge region according to the atmospheric pressure and the temperature. That is, when the atmospheric pressure is low and the temperature is high, even if the surge voltage is comparatively low, there is a high risk of dielectric breakdown. Therefore, the high surge region may be expanded. The range of the high surge region may be determined by measuring a surge voltage through an experiment or the like and comparing the surge voltage with the specification (withstand voltage) of the motor generator.

FIG. 6 is a flowchart showing setting of a high surge region in the HVECU 30. The atmospheric pressure is acquired (S21), the temperature is acquired (S22), and the withstand voltage of the motor is calculated based on the atmospheric pressure and the temperature (S23). Then, a high surge region is set according to the calculated withstand voltage (S24). In this way, a condition for determining to be a high surge region is relaxed. For the temperature, the temperature of the motor generator to be controlled may be measured. A thermometer may be attached directly to the motor generator, or may be attached near the motor generator. If a refrigerant is circulated, the refrigerant temperature may be detected.

<Change of Change Timing of Transmission Gear Ratio>

In the example described above, since there is a risk to cause dielectric breakdown in the high surge region, the control for avoiding dielectric breakdown has been described. In FIGS. 7 and 8, processing when there is a low risk of dielectric breakdown in a high surge region during normal time will be described. In FIGS. 7 and 8, as an example, a case where shift gear stages are four stages of 1st to 4th is shown.

Figure 7A:
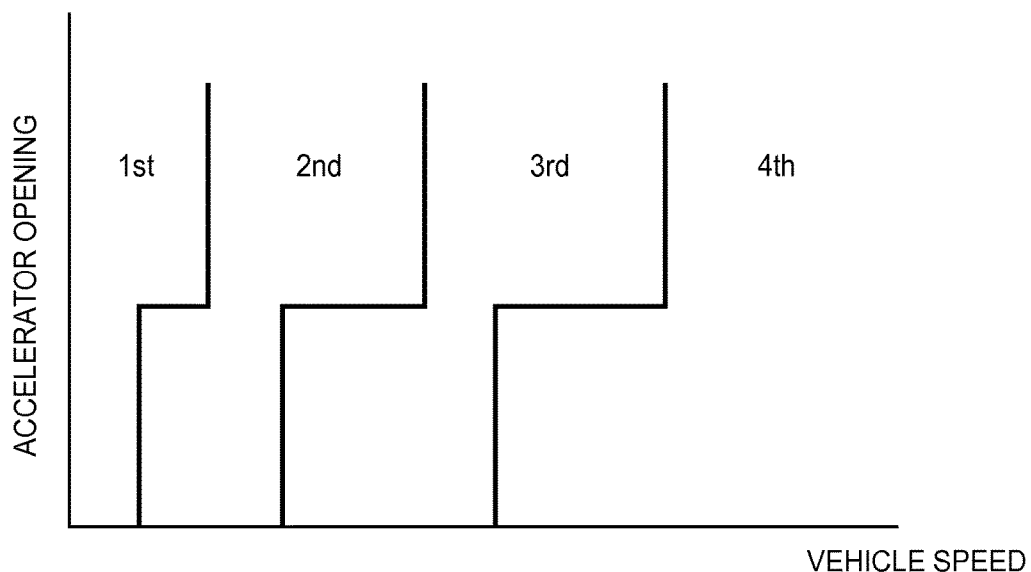
FIGS. 7A and 7B are diagrams showing gear shift and an operation state of a motor generator during normal time.
Figure 7B:
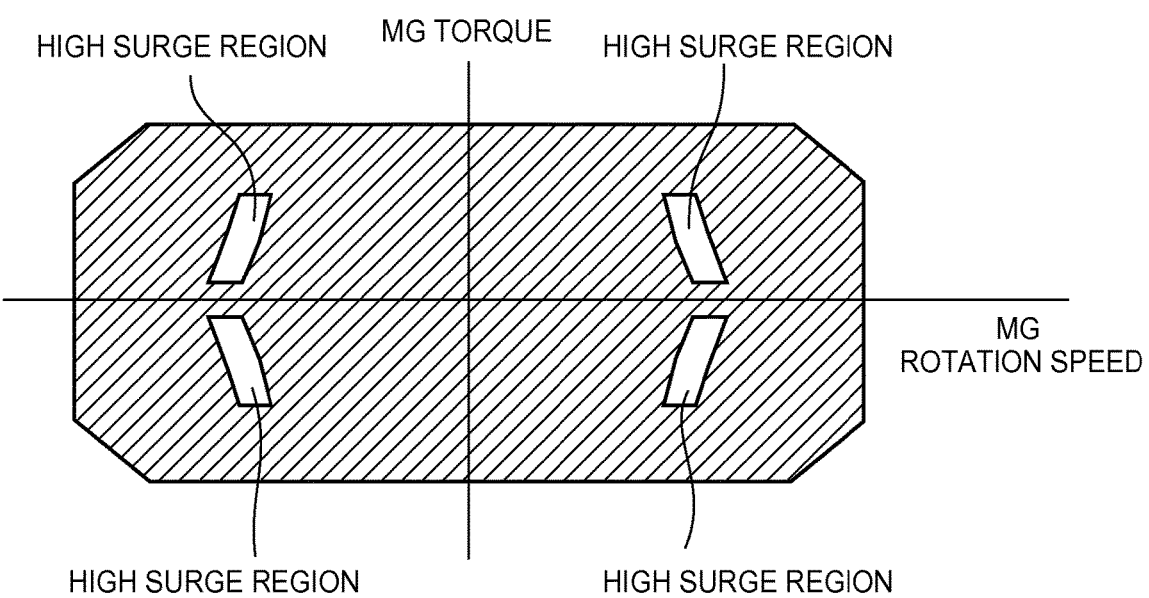

FIG. 7A is a diagram showing the relationship of an accelerator opening and a transmission gear ratio during normal time, and FIG. 7B is a diagram showing the relationship of torque and the rotation speed of the motor generator MG1 during normal time.

In this way, the operation point of the motor generator MG1 is set using the entire range of a predetermined rotation speed and torque including a high surge region. Note that the minus side of torque is power generation, the plus side of torque is powering, and the rotation direction is reversed on the plus side and the minus side of the rotation speed.

Figure 8A:
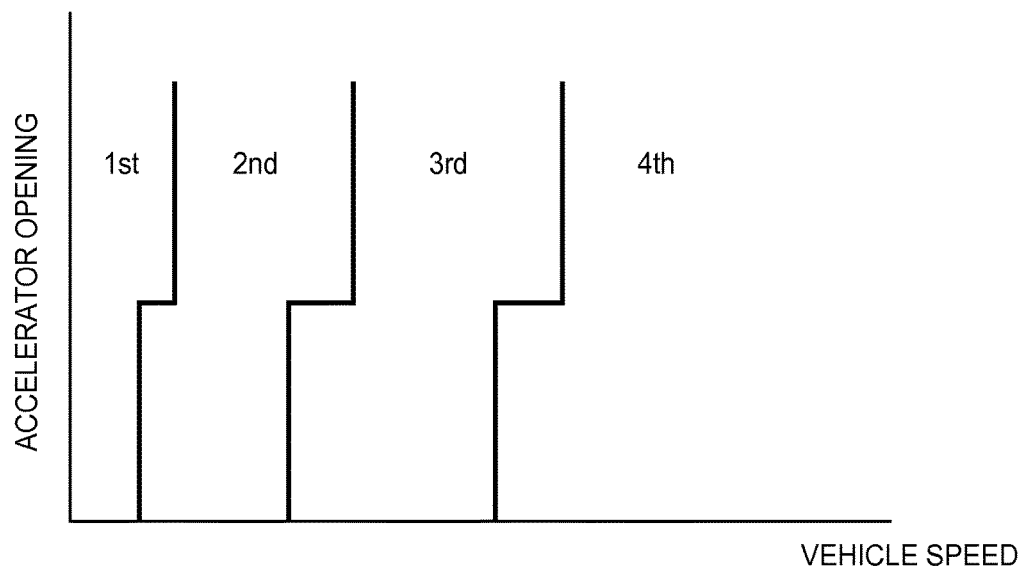
FIGS. 8A and 8B are diagrams showing gear shift and an operation state of a motor generator at a low atmospheric pressure and a high temperature.
Figure 8B:
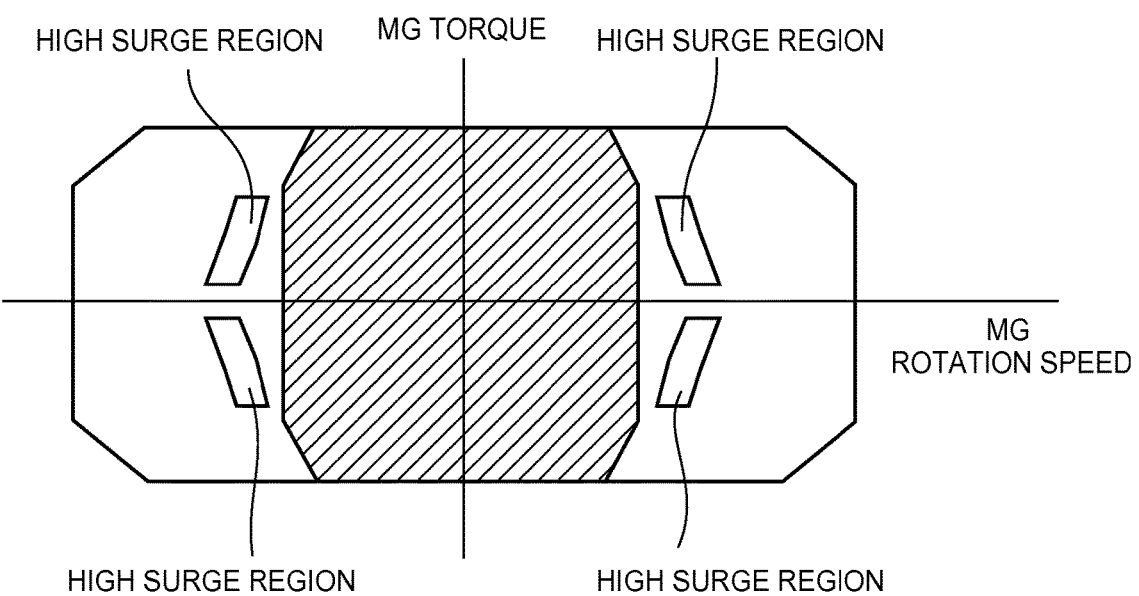

FIG. 8A is a diagram showing the relationship of an accelerator opening and a transmission gear ratio at a high temperature or at a low atmospheric pressure, and FIG. 8B is a diagram showing the relationship of torque and the rotation speed of the motor generator MG1 at a high temperature or at a low atmospheric pressure.

In this way, upshift is performed comparatively early, whereby it is possible to avoid operation at a high rotation speed or to avoid operation in the high surge region.

Figure 9:
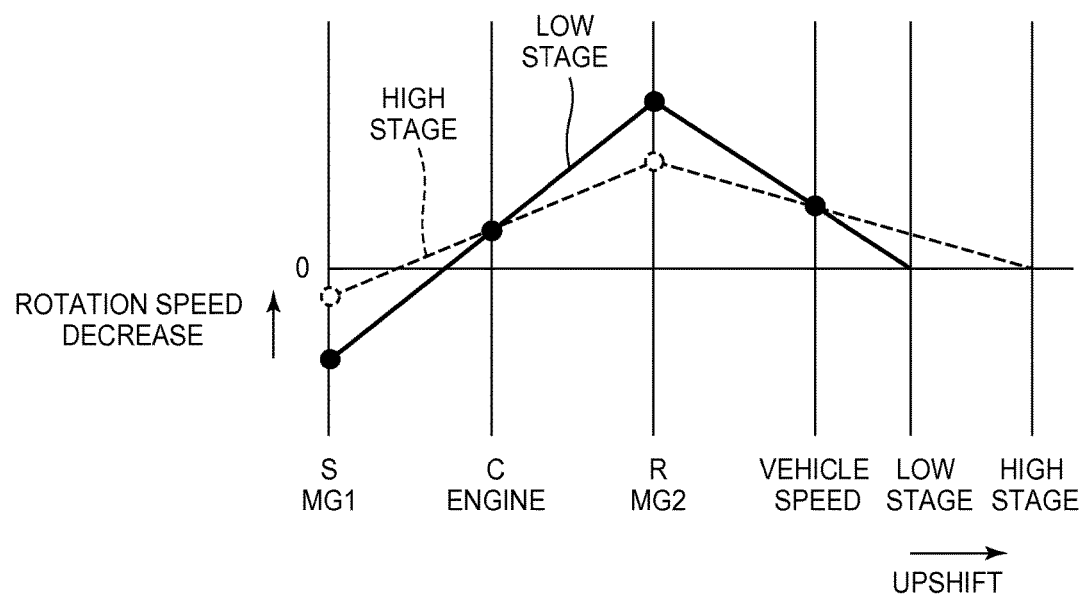
FIG. 9 is a diagram showing the state of a rotation speed of a planetary gear in gear shift.

For example, as shown in FIG. 9, the shift gear stage of the transmission 18 is upshifted from a low-speed stage to a high-speed stage, whereby the rotation speed of the ring gear decreases while maintaining the vehicle speed. Since the carrier (engine) rotation speed has no change, the rotation speed of the sun gear, that is, the motor generator MG1 decreases. While the rotation speed of the motor generator MG1 is determined by the rotation speed of the ring gear and the sun gear, when the engine 20 is stopped and the carrier is set to a fixed state (the rotation speed is 0), the motor generator MG1 is in a reverse rotation state, and the rotation speed can decrease by early upshift. It is possible to determine the transmission gear ratio for avoiding the high surge region according to the engine speed, the vehicle speed, or the like, and it is preferable to control the rotation speed of the motor generator MG1 according to the determined result. In general, as in FIG. 8, upshift is performed early, whereby it is possible to limit the rotation speed of the motor generator MG1.

Figure 10:
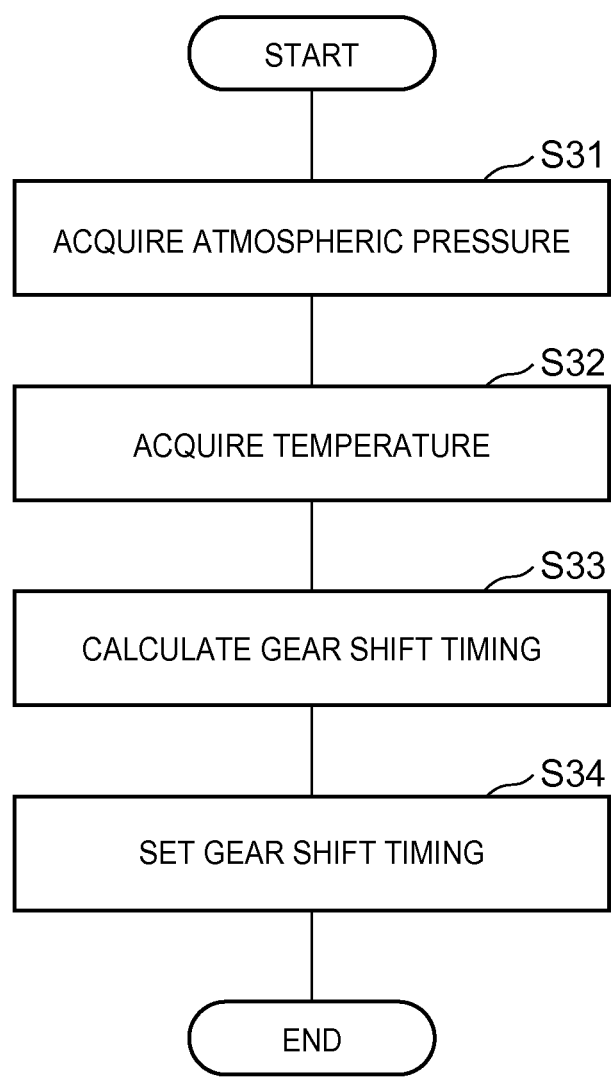
FIG. 10 is a flowchart showing setting of a gear shift timing.

FIG. 10 is a flowchart for changing a gear shift timing in the HVECU 30. The atmospheric pressure is acquired (S31), the temperature is acquired (S32), the withstand voltage of the motor is calculated based on the atmospheric pressure and the temperature, and the gear shift timing is calculated based on the withstand voltage of the motor (S33). Then, the calculated gear shift timing is set (S34).

Even with this embodiment, entering the high surge region is prevented by changing the transmission gear ratio.

<Processing During Constant Speed Traveling>

If the surge voltage exceeds the withstand voltage, there is a high risk of dielectric breakdown; however, dielectric breakdown is likely to occur due to deterioration of an insulating material. Accordingly, if the number of times of application of a high surge voltage is large, dielectric breakdown is more likely to occur.

When a change in the rotation speed and a change in output torque are small, during constant speed traveling on a flat road, or the like, there is a high possibility that the operation point of the motor generator stays in the substantially same region. Accordingly, it is considered that, when a change in the vehicle speed is small, the processing for avoiding the high surge region is performed, and when a change in the vehicle speed is large, the processing for avoiding the high surge region is not performed. The determination that a change in the vehicle speed is small may be performed under a condition that an auto-cruise mode is executed, a change in the vehicle speed for a predetermined period (for example, for one minute) is within 5%, or the like. During constant speed traveling, as described above, the high surge region is preferably expanded.

<Processing During Steady Traveling>

In a state where not only a change in the vehicle speed but also a change in output torque is small (referred to as during steady traveling), there is higher probability that the operation point becomes the substantially same region. Accordingly, when the steady traveling state is detected, the processing for avoiding the high surge region may be performed, and when changes in the vehicle speed and output torque are large, the processing for avoiding the high surge region may not be performed. During steady traveling, a condition that changes in the vehicle speed and output torque for a predetermined period (for example, for one minute) are within 5%, or the like may be set. During steady traveling, the high surge region is preferably expanded.

Figure 11:
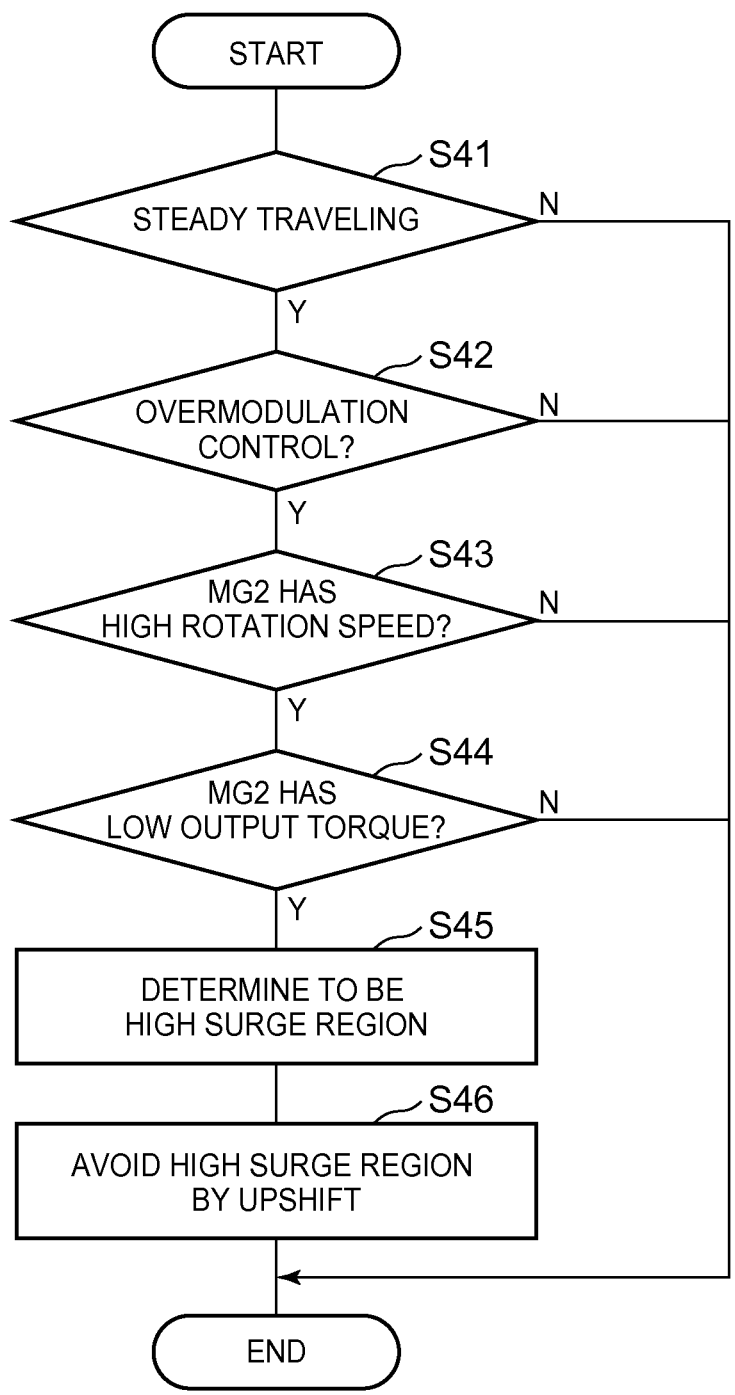
FIG. 11 is a flowchart showing high surge region avoidance processing during steady traveling.

FIG. 11 is a flowchart of high surge region avoidance processing only during steady traveling in the HVECU 30.

First, it is determined whether or not steady traveling is enabled (S41). When the determination of S41 is YES, it is determined whether or not overmodulation control is performed (S42), if the determination is YES, it is determined whether or not the motor generator MG2 has a high rotation speed (S43), if the determination is YES, it is determined whether or not the motor generator MG2 has low output torque (S44), and if the determination is YES, it is determined that the operation point of the motor generator MG2 is in the high surge region (S45). Accordingly, upshift is executed in the transmission 18, and the rotation speed of the motor generator MG2 decrease while maintaining the vehicle speed, thereby avoiding entering the high surge region (S46). In S41, S42, S43, and S44, when the determination is NO, the processing ends as it is.

With this processing, the processing for avoiding the high surge region is performed only during steady traveling, and the avoidance processing is not performed during normal time. When entering the high surge region needs to be avoided any number of times, such processing is preferably performed. Since the withstand voltage is different depending on the motor generator, when a motor generator of a comparatively large withstand voltage is used, such processing is preferably performed.

Figure 12:
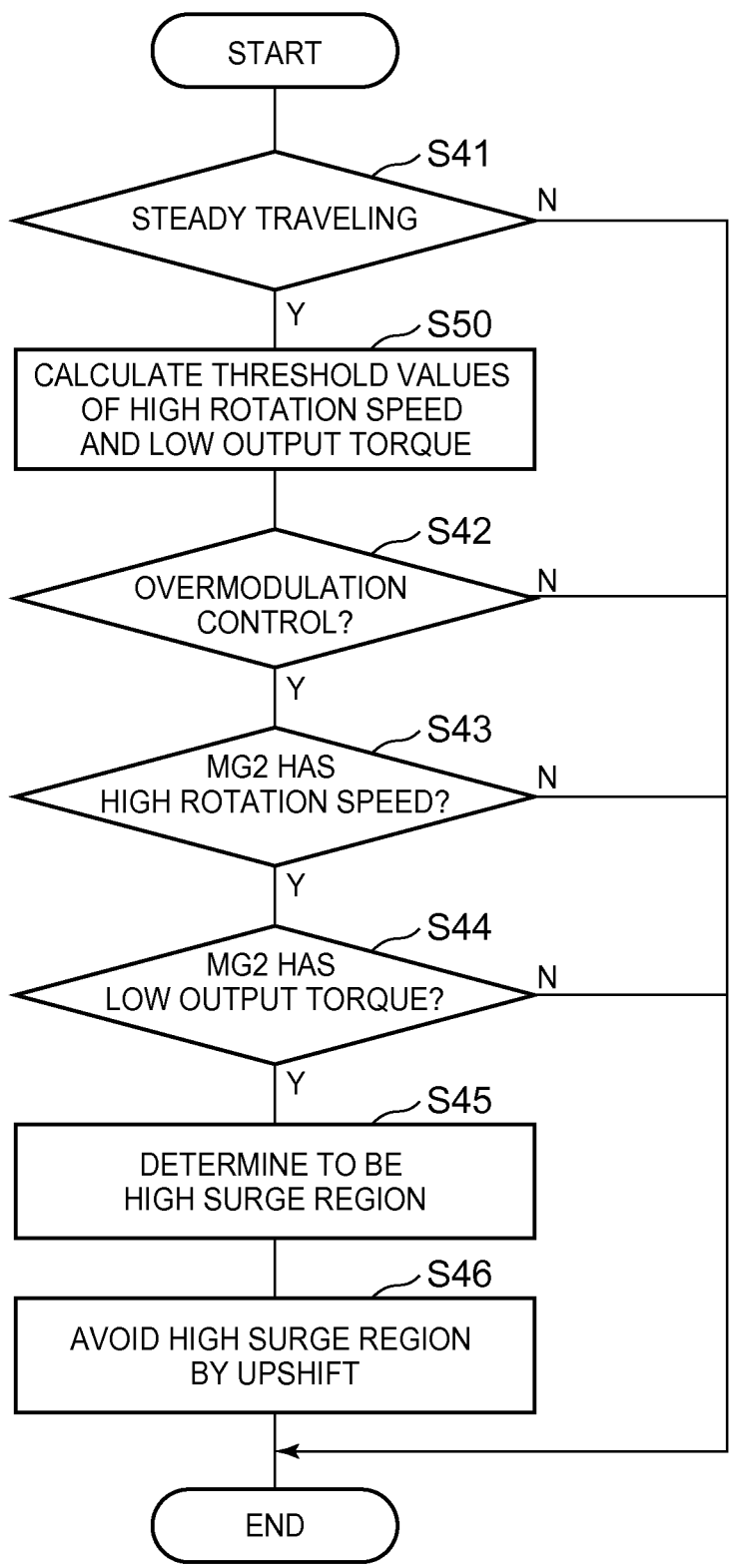
FIG. 12 is a flowchart showing high surge region avoidance processing during steady traveling.

FIG. 12 shows processing when the high surge region is expanded during steady traveling. That is, in S41, when the determination is YES, a threshold value regarded as a high rotation speed and a threshold value regarded as low output torque are calculated (S50), the threshold value regarded as a high rotation speed is set to be low, and the threshold value regarded as low output torque is set to be high. After S42, it is determined whether or not the operation point of the motor generator is in the high surge region using the set threshold values, and the avoidance processing is performed.

With such processing, during steady traveling, it is easily determined that the operation point of the motor generator is in the high surge region (the condition is relaxed), the frequency of avoidance control increases, and dielectric breakdown of the motor generator is effectively prevented.

What is claimed is:

1. An electric powered vehicle comprising:
a motor;
an inverter configured to convert electric power from a battery to drive the motor;
a transmission configured to shift a rotation output of the motor at a variable transmission gear ratio; and
a controller configured to control the inverter to control the driving of the motor and to control a change in a shift gear stage of the transmission,
wherein, when an operation point of the motor enters a high surge region where the inverter is controlled by a PWM overmodulation control system, the controller is configured to perform high surge region avoidance control by changing the shift gear stage of the transmission to change a motor rotation speed while maintaining a vehicle speed and changing the operation point to be outside the high surge region, wherein the high surge region is defined to be equal to or higher than a predetermined rotation speed and equal to or less than predetermined torque.

2. The electric powered vehicle according to claim 1, wherein the controller is configured to change a range of the high surge region according to motor temperature, atmospheric pressure, or an inverter input voltage.

3. The electric powered vehicle according to claim 1, wherein the controller is configured to relax a condition for performing the high surge region avoidance control during steady traveling with little fluctuation in the vehicle speed.

* * * * *